United States Patent [19]
Rembold et al.

[11] Patent Number: 5,671,717
[45] Date of Patent: Sep. 30, 1997

[54] FUEL AND AUXILIARY FLUID INJECTION SYSTEM FOR AN INTERNAL COMBUSTION ENGINE

[75] Inventors: Helmut Rembold, Stuttgart; Walter Teegen, Waiblingen, both of Germany

[73] Assignee: Robert Bosch GmbH, Stuttgart, Germany

[21] Appl. No.: 702,876

[22] Filed: Aug. 26, 1996

[30] Foreign Application Priority Data

Aug. 30, 1995 [DE] Germany .................. 195 31 812.9
May 15, 1996 [DE] Germany .................. 196 19 522.5

[51] Int. Cl.⁶ .................................................. F02B 47/02
[52] U.S. Cl. ........................................ 123/495; 123/25 C
[58] Field of Search .......................... 123/25 C, 495, 123/506

[56] References Cited

U.S. PATENT DOCUMENTS 5,170,751  12/1992  Tosa et al. ..................... 123/25 C
5,245,953   9/1993  Shimada et al. ................ 123/25 C
5,529,024   6/1996  Wirbeleit et al. .............. 123/25 C Primary Examiner—Erick R. Solis
Attorney, Agent, or Firm—Edwin E. Greigg; Ronald E. Greigg

[57] ABSTRACT

An engine injection system for a combined injection of fuel and an auxiliary fluid into a combustion chamber of an internal combustion engine. A fuel injection pump is used for pumping both fuel and the auxiliary fluid at high pressure. The pump communicates with an injection nozzle and, via a magnet valve assembly, with a fluid metering device, which in turn communicates via a metering line with the injection nozzle. Connecting the magnet valve assembly directly to the supply outlet of the fuel injection pump upstream of an equal-pressure valve, and providing a pressure generator in the metering device, given a suitable triggering of the magnet valve assembly, the remaining supply stroke of the pump piston of the fuel injection pump after the end of the fuel injection by the injection nozzle is utilized to generate the requisite metering pressure in the metering device to enable the auxiliary fluid that is to be metered to be stored in the injection nozzle.

21 Claims, 6 Drawing Sheets

FUEL AND AUXILIARY FLUID INJECTION SYSTEM FOR AN INTERNAL COMBUSTION ENGINE

BACKGROUND OF THE INVENTION

The invention is based on an injection system for combined injection of fuel, especially Diesel fuel, and auxiliary fluid, especially water, into at least one combustion chamber of an internal combustion engine.

The combined injection of fuel and auxiliary fluid serves to reduce nitrogen oxide and soot emissions, particular for Diesel engines.

In a known injection system of this type (German Patent DE 44 07 052 C1), the fuel imposition of the pressure generator in the metering device for the auxiliary fluid is attained by providing that by means of an additional cam that together with the cam of the reciprocating drive of the pump piston forms a double cam, the pump piston of the fuel injection pump is driven to reciprocate again in the interval between injection and thus pumps fuel that is delivered to the pressure generator via a 4/2-way magnet valve with spring restoration in the magnet valve assembly. By means of a dividing piston acted upon by the pressure of this fuel, a corresponding quantity of water is supplied to the nozzle chamber of the injection nozzle, which positively displaces a corresponding quantity of fuel from the nozzle chamber and allows it to flow out via the 4/2-way magnet valve. The quantity of fuel that is injected via the injection valve on each supply stroke of the pump piston is controlled by the rotation of the pump piston. Varying the fuel injection quantity by rotating the pump piston causes an identical variation in the quantity of water pressed into the nozzle chamber in the ensuing stroke of the pump piston under the influence of the additional cam. A fixed ratio of fuel to water is always adhered to. By means of a further 3/2-way magnet valve with spring restoration in the magnet valve assembly, the storage of water in the nozzle chamber can be stopped or varied as needed.

OBJECT AND SUMMARY OF THE INVENTION

The injection system according to the invention has the advantage over the prior art that on the one hand the additional cam is omitted, and accordingly no changes need to be made in the fuel injection pump, and on the other the magnet valve assembly can be made substantially more economically. Furthermore, the quantity of auxiliary fluid supplied to the nozzle chamber of the injection nozzle can be adapted individually and highly accurately to the requisite demand by simple control of the magnet valve assembly. Advantageous further features of and improvements to the injection system are possible by the provisions recited hereinafter.

In accordance with a first embodiment of the invention, the pressure generator has a dividing piston, connected via a check valve to a prefeed pump and displaceable by fuel actuation counter to a restoring spring and in the process positively displacing a quantity of auxiliary fluid, and a spring reservoir, communicating with the dividing piston and having a reservoir cylinder, reservoir spring and reservoir piston, and a travel transducer that senses the displacement travel of the reservoir piston. Disposed between the check valve associated with the injection nozzle and the metering line connected to the check valve is a hydraulically controlled switch element, which is connected by its control inlet to the supply outlet of the fuel injection pump and is designed such that, above a pressure that is approximately equal to the standing pressure set in the nozzle chamber by the equal-pressure valve, it is closed. The magnet valve assembly comprises inexpensive 2/2-way magnet valves with spring restoration, each connected on the inlet side to the supply outlet of the fuel injection pump and preferably connected via a check valve; of these, the first magnet valve communicates on the outlet side with the relief line and the second magnet valve communicates on the outlet side with the dividing piston.

In an alternative embodiment of the invention, which is suitable for a higher rpm, the magnet valve assembly again comprises the inexpensive 2/2-way magnet valves with spring restoration. Here, however, the first magnet valve communicates on the inlet side with the supply outlet of the fuel injection pump, preferably via a check valve, and on the outlet side with the relief line, and the second magnet valve communicates on the inlet side with the dividing piston and on the outlet side again with the relief line. Between the two inlets of the magnet valves is a further check valve whose flow direction is toward the dividing piston or the second magnet valve and whose flow cross section is greater than the magnet valve.

In these aforementioned embodiments, control of the magnet valve assembly is provided in such a way that for the duration of fuel injection, the two magnet valves close; at the end of the fuel injection, the second magnet valve opens; in response to a first control signal, which is derived from the travel transducer and is tripped when a predetermined displacement travel of the reservoir piston in the spring reservoir is attained, the second magnet valve closes again and the first magnet valve opens again; and in response to a second sensor signal tripped by the travel transducer, which signal is tripped after the return of the reservoir piston of the spring reservoir to its basic position, the second magnet valve opens again.

In accordance with an alternative embodiment of the invention, the pressure generator has a pressure step-up device, with a stepped piston that is displaceable counter to a restoring spring, which piston, with its larger-diameter piston, defines a control chamber connected to the magnet valve assembly and with its smaller-diameter piston defines a positive displacement chamber connected to the prefeed pump. Also belonging to the metering device for the auxiliary fluid is a distributor with a distributor cylinder, which has a plurality of radial outflow bores distributed uniformly over the circumference, and having a distributor shaft rotating in it and driven by the fuel injection pump, which distributor shaft has a distributor bore, connected to the positive displacement chamber of the pressure step-up device and entering into communication successively with each of the outflow bores upon rotation of the distributor shaft. One metering line leading to the metering device is connected to each outflow bore. The magnet valve assembly is embodied here by at least one first and one second 2/2-way magnet valve with spring restoration, which are connected in series; the first magnet valve is connected on the inlet side to the supply outlet of the fuel injection pump, and the second magnet valve is connected on the outlet side to the relief line. The control chamber of the pressure step-up device is connected via a check valve, whose flow direction is toward the pressure step-up device, to the connecting line between the two magnet valves. The control of the magnet valves is effected such that for the duration of the fuel injection, the first magnet valve closes; at the end of the fuel injection, the first magnet valve opens; and after a predetermined period of time the second magnet valve closes and then opens again once the pump piston of the fuel injection pump has passed through its top dead center.

DESCRIPTION OF THE PREFERRED EMBODIMENTS

Figure 1:
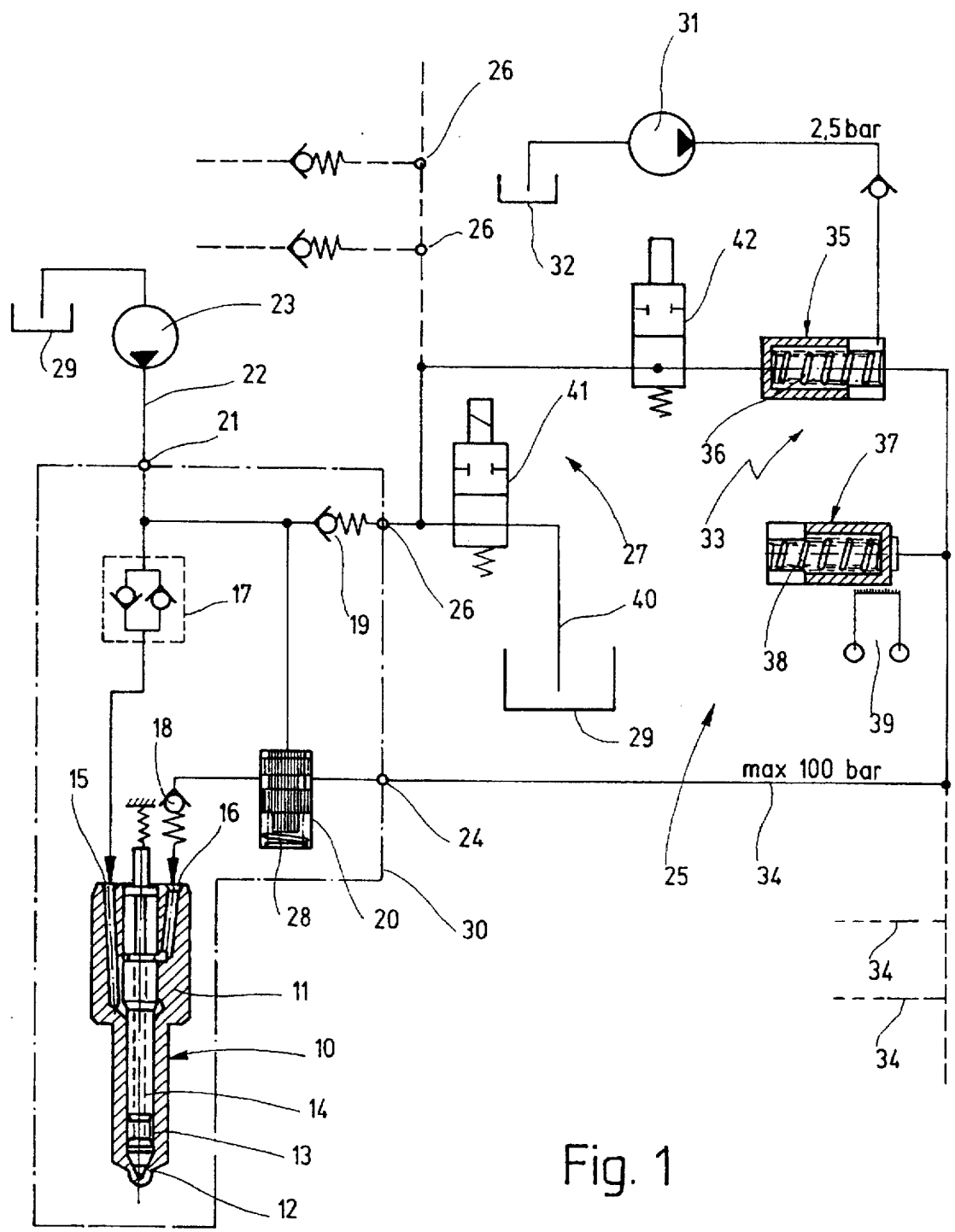
FIG. 1 is a block circuit diagram of an injection system for the combined injection of fuel and auxiliary fluid.

The injection system shown in a block circuit diagram in FIG. 1 for the combined injection of fuel, in this case Diesel fuel, and auxiliary fluid, in this case water, into an internal combustion engine, in this case a Diesel engine, has a number of injection nozzles 10, corresponding to the number of cylinders of the Diesel engine, for fuel injection into the combustion chamber of the respective combustion cylinder; these nozzles each include one nozzle body 11 with an injection opening 12 at the end and preceding it a nozzle chamber 13, as well as a nozzle needle 14 that controls the injection opening 12 and is axially displaceably guided in the nozzle body 11. The nozzle needle 14 rests in a known manner under spring pressure on a valve seat embodied in the nozzle body 11, and if there is adequate fuel pressure in the nozzle chamber 13 (injection pressure), the nozzle needle lifts up from the valve seat, thereby uncovering the injection opening 12 so that the mixture of fuel and water can be injected into the combustion chamber of the combustion cylinder. The nozzle chamber 13 communicates with two nozzle connections 15, 16. The injection nozzle 10 is combined with an equal-pressure valve 17, a first check valve 18, a second check valve 19, and a hydraulically controlled switch element 20 to form a component unit, known as the nozzle module 30, each of which is assigned to one combustion cylinder of the Diesel engine. The nozzle module 30 has a connection 21 for an injection line 22 leading to a fuel injection pump 23; a connection 24 for a water metering device 25; and a connection 26 for a magnet valve assembly 27 that connects the metering device 25 to the fuel injection pump 23. The equal-pressure valve 17 connects the connection 21 for the injection line 22 to the nozzle connection 15 on the nozzle body 11; the second check valve 19 connects the connection 21 for the injection line 22 to the connection 26 for the magnet valve assembly 27; the open direction for the second check valve 19 is from the connection 21 to the connection 26. The connection 24 for the metering device 25 communicates with the nozzle connection 16 on the nozzle body 11 via the hydraulically controlled switch element 20 and the first check valve 18. The control connection of the switch element 20 communicates with the connection 21 for the injection line 22. A restoring spring 28 changes the switch element 20 to its open position when the pressure at the control connection is equivalent to a value that undershoots the standing pressure set by the equal-pressure valve 17 in the nozzle chamber 13. Above this pressure value, the switch element 20 is closed and blocks the flow to the injection nozzle 10. The fuel injection pump 23, of a known design, which may be either an in-line or a distributor-type injection pump, is merely symbolically represented in FIG. 1. In the case of an in-line injection pump, in a known manner one separate pump element is provided for each injection nozzle 10, and in it a pump piston executing a reciprocating motion aspirates fuel from a fuel supply 29 and pumps it at injection pressure into the injection line 22. In the case of a distributor injection pump, only one pump piston is provided, which in a known manner executes a rotary motion and simultaneously a reciprocating motion; upon each pump piston stroke, one of a plurality of distributor bores is triggered, each being connected to one injection line 22.

The metering device 25 has a prefeed pump 31 for feeding water from a water tank 32, and a pressure generator 33, which puts the water pumped by the prefeed pump 31 at a pressure that is above the standing pressure that is maintained by the equal-pressure valve 17 in the nozzle chamber 13 when the injection nozzle 10 is closed. The outlet of the pressure generator 33 communicates via a metering line 34 with the connection 24 of the nozzle module 30. To generate the water pressure, the fuel pressure of the fuel injection pump 23 is utilized; to that end, the inlet of the pressure generator 33 communicates with the fuel injection pump 23 via the magnet valve assembly 27, or more specifically is connected to the connection 26 of the nozzle module 30.

In the exemplary embodiment of FIG. 1, the pressure generator 33 comprises a dividing piston 35 and a spring reservoir 37. The dividing piston 35, shown only schematically here, divides a fuel chamber from a water chamber and is urged by a restoring spring 36 counter to the pressure in the fuel chamber; the spring reservoir 37, again only schematically shown, has a reservoir cylinder, reservoir spring and reservoir piston. The reservoir piston defines a reservoir chamber and is urged by the reservoir spring 38 counter to the reservoir pressure in the reservoir chamber. The outlet of the prefeed pump 31 communicates with the water chamber of the dividing piston 35, and the latter communicates with the reservoir chamber of the spring reservoir 37, which in turn is connected via the metering line 34 to the connection 24 of the nozzle module 30. The spring reservoir 37 is equipped with a travel transducer 39, which senses the displacement travel of the reservoir piston in the spring reservoir 37.

The magnet valve assembly 27 comprises two inexpensive 2/2-way magnet valves 41, 42 with spring restoration, which are connected on the inlet side to the nozzle module 30 via the connection 26. On the outlet side, the first magnet valve 41 is connected to a relief or return line 40, and the second magnet valve 42 is connected to the fuel chamber of the dividing piston 35. In the basic position, that is, with the magnet unexcited, both magnet valves 41, 42 are in the open position and enable the flow of fuel through them. The connection of additional nozzle modules 30 to the metering device 25 and the magnet valve assembly 27 is suggested by showing additional connections 26 of nozzle modules 30 and additional metering lines 34 in the form of dashed lines.

Figure 3:
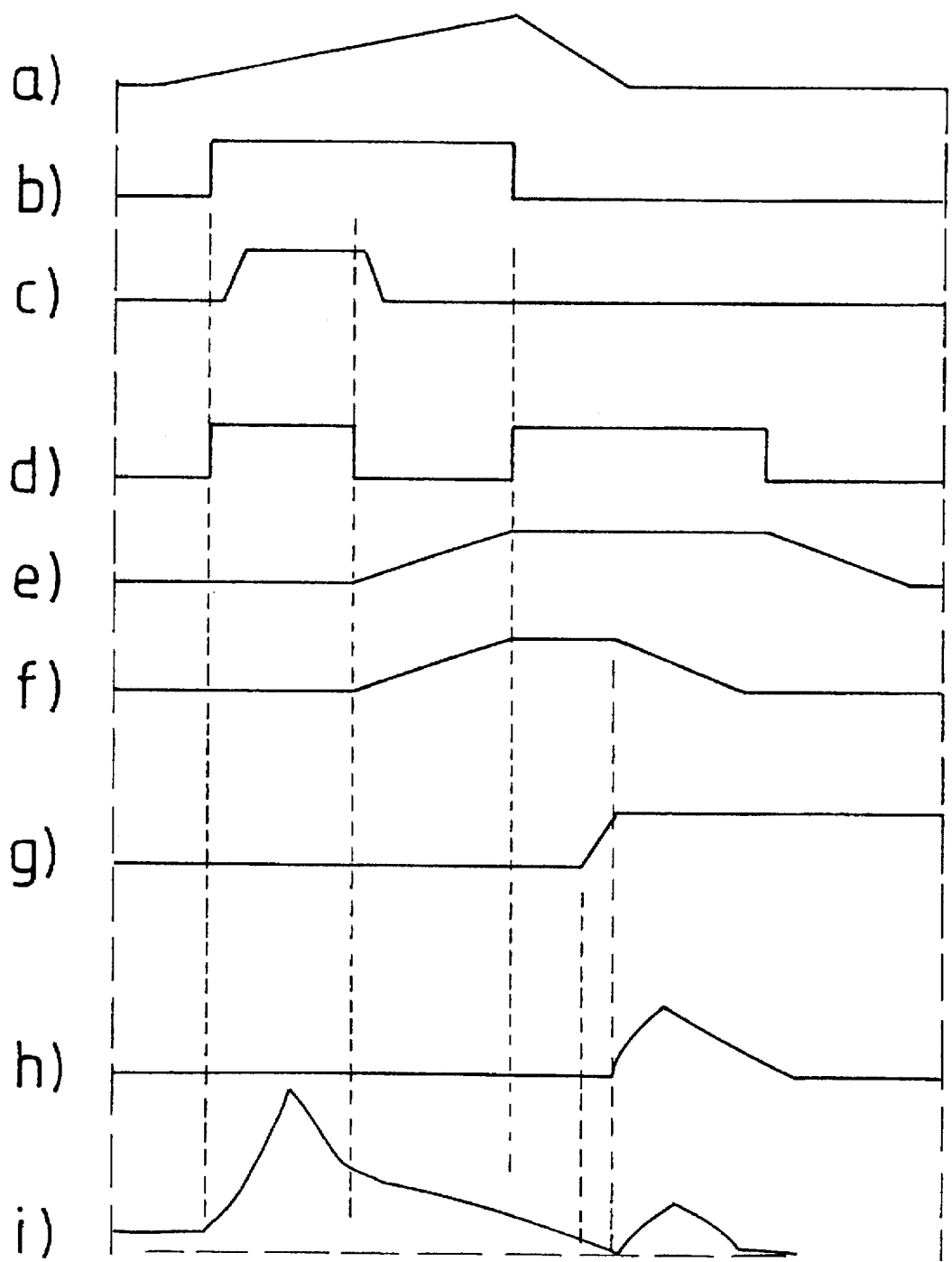
FIG. 3, a function graph of the injection system of FIG. 1.

An electronic control unit, not shown here, which is also supplied with the travel signal of the travel transducer 39, now controls the valve assembly 27, in such a way that during the supply stroke of the pump piston of the fuel injection pump 23, on the one hand it closes at the onset of fuel supply and on the other opens at the end of injection and causes the supply outlet of the fuel injection pump 23 to communicate with the pressure generator 33 for a predeterminable duration of the remaining supply stroke of the pump piston. The control process is shown in detail in the function graph of FIG. 3. Curve a represents the stroke of the pump piston in the fuel injection pump 23; curve b shows the stroke of the first magnet valve 41; curve c shows the stroke of the nozzle needle 14 in the injection nozzle 10; the curve d shows the stroke of the second magnet valve 42; the curve e shows the displacement travel of the dividing piston 35; the curve f shows the displacement travel of the reservoir piston in the spring reservoir 37; the curve g shows the stroke of the switch element 20; the curve h shows the course of pressure at the inlet to the check valve 18; and the curve i shows the course of pressure in the injection line 22. During the stroke of the pump piston of the fuel injection pump 23 (curve a), the buildup of injection pressure begins with the closure of the two magnet valves 41, 42, as a result of which the connection 26 at the nozzle module 30 is closed. Once the injection pressure is reached, the injection nozzle opens (curve c and curve i). With the opening of the second magnet valve 42 (curve d), the injection event is terminated; the nozzle needle 14 seats on the needle seat and again encloses the injection nozzle 10 (curve c). The fuel pumped as the supply stroke of the pump piston continues (curve a) is carried via the opened second magnet valve 42 to the dividing piston 35. The fuel pressure present there is utilized to build up a pressure in the water system and to supply the spring reservoir 37 with the requisite quantity of water (curves e and f). The travel transducer 39 monitors the displacement travel of the reservoir piston in the spring reservoir 37 and supplies a corresponding actual-value signal to the control unit. Once a predetermined displacement travel of the reservoir piston is reached, or in other words once a certain quantity of water has been stored in the spring reservoir 37, the control unit closes the second magnet valve 42 again (curve d). During this time, the switch element 20 is closed. Not until the pressure at the connection 21 drops below the standing pressure specified by the equal-pressure valve 17 does the switch element 20 open (curve g), and the water quantity stored in the spring reservoir 37 is stored in the nozzle chamber 13 via the metering line 34, the opened switch element 20 and the check valve 18 (curve h). An equal quantity of fuel is positively displaced from the nozzle chamber 13 in the process; via the equal-pressure valve 17, the second check valve 19, and the meanwhile reopened first magnet valve 41, this fuel flows out into the relief line 40 and back to the fuel supply 29. The pressure downstream of the switch element 20 (curve h) has become virtually nil once the reservoir piston of the spring reservoir 37 has returned to its basic position (curve f). The return of the reservoir piston to its basic position is detected by the control unit from the actual-value signal of the travel transducer 39, and the control unit thereupon reopens the second magnet valve 42 (curve d). Because of the fuel thus flowing out of the fuel chamber of the dividing piston 35 into the relief line 40, via the second and first magnet valves 42, 41, the dividing piston 35 is pushed back into its basic position by the restoring spring 37.

Figure 2:
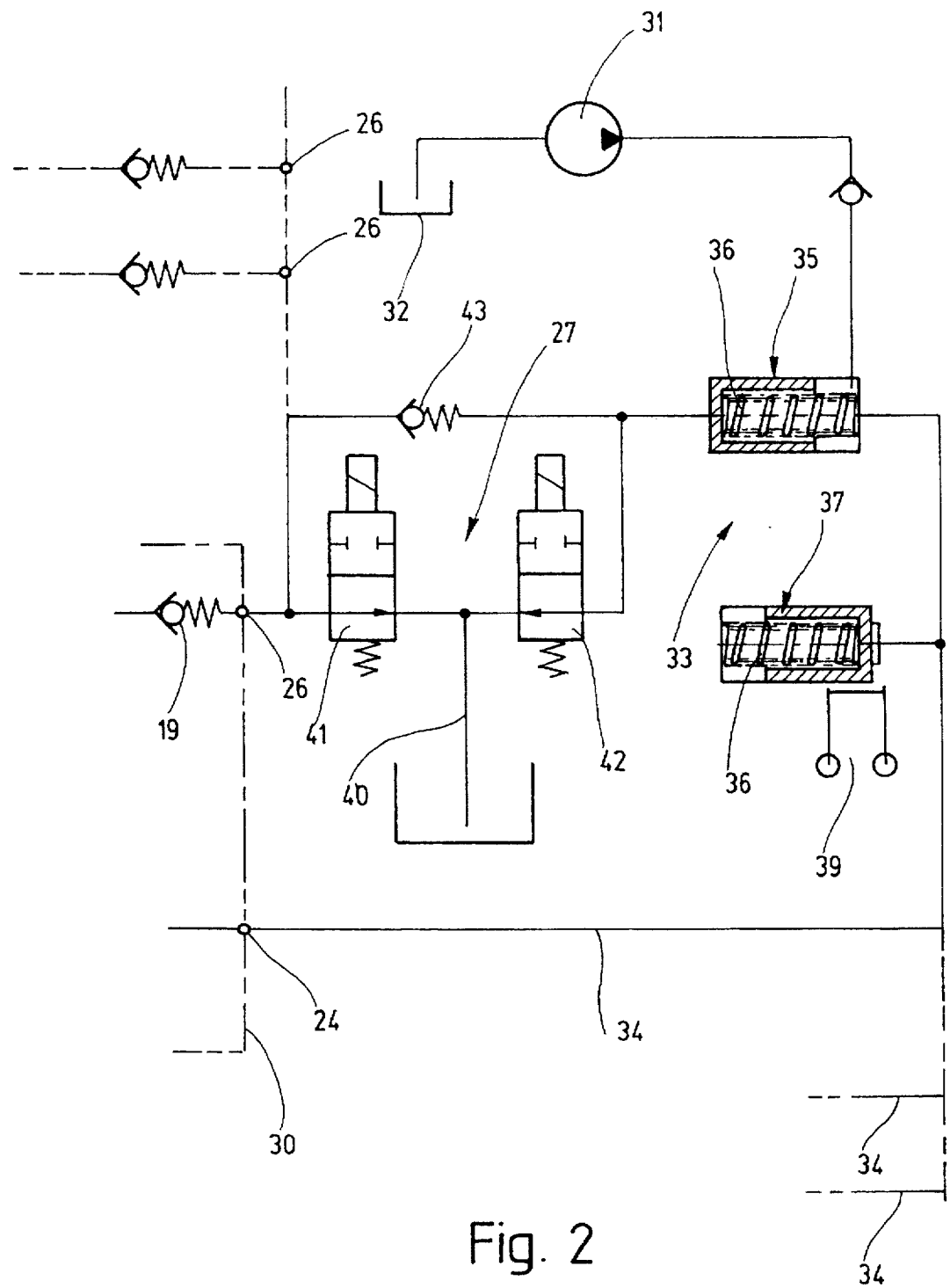
FIG. 2 is a block circuit diagram of a modified metering device for the auxiliary fluid in the injection system of FIG. 1.

A modification of the metering device 25 for water in combination with the valve assembly 27 that is suitable for high rpm, or in other words for high-speed Diesel engines, is shown in FIG. 2. To the extent that components match those of FIG. 1, they are provided with the same reference numerals:

Once again, the valve assembly 27 here comprises the two 2/2-way magnet valves 41, 42 with spring restoration, and one additional check valve 43. The first magnet valve 41 is again connected on the inlet side to the connection 26 of the nozzle module 30 and on the outlet side to the relief line 40. The second magnet valve 42 is connected on the inlet side to the inlet of the dividing piston 35 and hence to its fuel chamber and on the outlet side is likewise connected to the relief line 40. The check valve 43 communicates on the one hand with the connection 26 and on the other with the inlet of the dividing piston 35, or in other words is located between the two inlets of the magnet valves 41, 42; the open direction of the check valve 43 is to the dividing piston 35 or to the second magnet valve 42. The flow cross section of the check valve 43 is dimensioned as substantially larger than that of the second magnet valve 42, so that after the second magnet valve 42 has opened, a pressure can build up in the fuel chamber of the dividing piston 35 for terminating the injection event even when the magnet valve 42 is open. The mode of operation of the injection pump with the modified magnet valve assembly 27 is the same as has been described in conjunction with FIG. 1. The function graph shown in FIG. 3 also applies in the same way.

Figure 4:
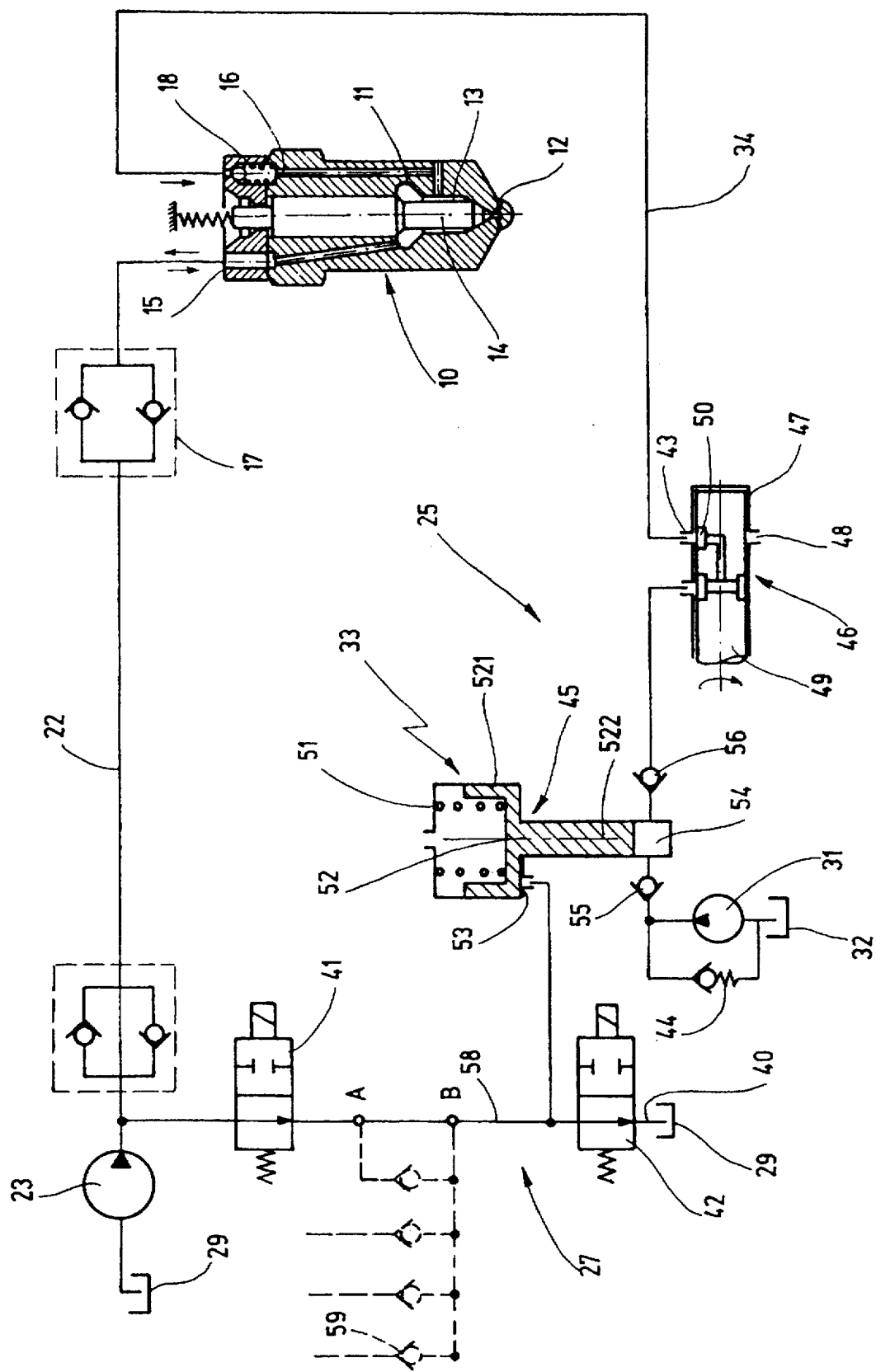
FIG. 4, is a block circuit diagram of an injection system for the combined injection of fuel and auxiliary fluid in accordance with a further exemplary embodiment.

In FIG. 4, a further exemplary embodiment for an injection system is shown as a block circuit diagram. To the extent that components of this injection system correspond to those of FIG. 1, they are provided with the same reference numerals.

The structurally identical nozzle 10 communicates, in the same way as in FIG. 1, on the inlet side with the supply outlet of the fuel injection pump 23 via the equal-pressure valve 17 and the injection line 22, and on the other with the metering device 25 for water, via the check valve 18 and the metering line 34. Once again, the magnet valve assembly 27 is connected between the fuel injection pump 23 and the metering device 25. As in FIG. 1, the metering device 25 has a prefeed pump 31, which pumps water from a water tank 32 in circulation back to the water tank 32 via a pressure holding valve 44 set to approximately 5 bar, and also has the pressure generator 33, which is embodied here as a pressure step-up device 45. The metering device 25 also includes a distributor 46, which has a distributor cylinder 47, with a plurality of outflow bores 48 distributed uniformly over the circumference, and a distributor shaft 49, rotating in the distributor cylinder 47, with a distributor bore 50 discharging radially at the circumference of the distributor shaft 49; in the rotation of the distributor shaft 49, this distributor bore comes to coincide temporarily with each of the outflow bores 48, one at a time. The pressure step-up device 45 has a stepped piston 52, loaded by a piston spring 51; the larger-diameter piston part 521 defines a control chamber 53, and the smaller-diameter piston part defines a positive displacement chamber 54. The positive displacement chamber 54 communicates with the outlet of the prefeed pump 31 via an inlet valve 55 and with the distributor bore 50 in the distributor shaft 49 of the distributor 46 via an outlet valve 56; one metering line 34, each leading to one injection nozzle 10, is connected to the outflow bores 48 of the distributor. The number of outflow bores 48 is thus equivalent to the number of injection nozzles 10 present, which in turn is determined by the number of existing combustion cylinders of the Diesel engine. The inlet valve 55 and outlet valve 56 are embodied as check valves.

The magnet valve assembly 27 again comprises two 2/2-way magnet valves 41 and 42 with spring restoration. The two magnet valves 41, 42 are connected in series; the first magnet valve 41 communicates on the inlet side with a supply outlet of the fuel injection pump 23, here embodied as a distributor injection pump, and the second magnet valve 42 communicates on the outlet side with the relief line 40, which leads back to the fuel supply 29. The piston spring 51 engages the larger-diameter piston part 521 of the stepped piston 52 and seeks to displace it counter to the pressure in the control chamber 53. The distributor shaft 49 in the distributor 46 is driven synchronously by the distributor piston, not shown here, of the fuel injection pump 23. It is also possible for the function of the distributor 46 to be integrated directly with the distributor piston, by means of additional bores and control grooves.

Figure 5:
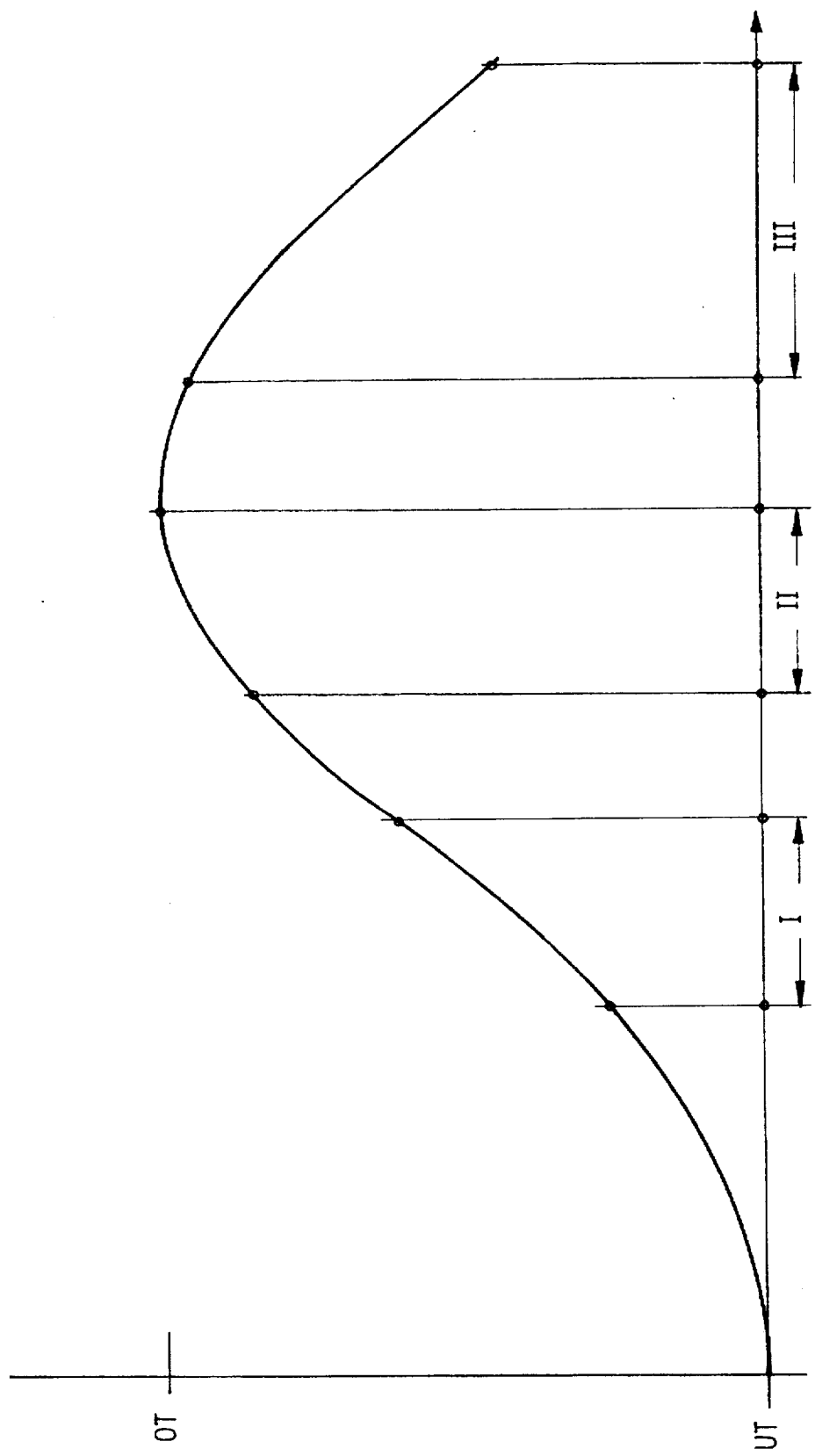
FIG. 5, a curve of the stroke of the pump piston of the fuel injection pump in the injection system of FIG. 4.

Once again, the magnet valves 41, 42 are controlled by means of an electronic control unit, specifically in such a way that the first magnet valve 41 is closed for the duration of fuel injection through the injection nozzle 10, and opens with the end of fuel injection, while the second magnet valve 42 closes after a predetermined period of time. The second magnet valve 42 then opens again once the distributor piston of the fuel injection pump 23 has passed through its top dead center in the course of its stroke. The stroke travel of the distributor piston of the fuel injection pump 23 is plotted in FIG. 5 over the rotary angle, or so-called cam angle, of the cam that sets the distributor piston into a reciprocating motion. From this stroke curve, the function of the injection system in FIG. 4 can be explained as follows:

In the supply stroke, the distributor piston of the fuel injection pump 23 travels through the stroke curve, shown in FIG. 5, from its bottom dead center UT to its top, dead center OT. In the intake stroke that then follows, the distributor piston travels through the stroke curve of FIG. 5 from its top dead center OT to its bottom dead center UT. In the supply stroke, after the closure of the so-called control edge by the distributor piston, with the magnet valve 41 closed, fuel supply begins. This is the range I in FIG. 5, within which fuel is injected via the injection nozzle 10 into the combustion chamber in the combustion cylinder of the Diesel engine—together with the water prestored in the nozzle chamber 13. The injection is terminated by the opening of the first magnet valve 41, so that the length of time that the first magnet valve 41 is closed also determines the quantity of fuel injected via the injection nozzle 10. When the magnet valve 41 opens, the fuel first flows via the open magnet valve 42 into the relief line 40 and from there back into the fuel supply 29. After a predetermined time interval, which is determined by the quantity of water to be added to the injection nozzle 10, the second magnet valve 42 closes, and in the remaining supply stroke of the distributor piston the fuel flows into the annular control chamber 53 of the pressure step-up device 45. This is the range II of FIG. 5. The stepped piston 52 of the pressure step-up device 45 deflects upward, with compression of the piston spring 51, and draws a corresponding quantity of water after it into the positive displacement chamber 54 via the inlet valve 55. The control pressure in the control chamber 53 is about 25 bar and thus is markedly below the nozzle opening pressure in the injection line 22. Because the fuel supply into the control chamber 53 always continues until top dead center OT of the distributor piston, interfering pressure waves are avoided. The quantity of water aspirated into the positive displacement chamber 54 is determined from the respective instant of actuation of the second magnet valve 42 before top dead center OT of the distributor piston. In the ensuing intake stroke of the distributor piston of the fuel injection pump 23, an outflow of the fuel from the control chamber 53 is prevented by the check valve 57. In the range III of FIG. 5, the distributor bore 50 corresponds with the outflow bore 48, connected to the metering line 34, and the water is now stored in the nozzle chamber 11 of the injection nozzle 10 from the positive displacement chamber 54, via the outlet valve 56, the metering line 34, and the check valve 18. The quantity of fuel positively displaced in the process flows back via the equal-pressure valve 17 and the injection line 22 into the suction chamber of the fuel injection pump 23.

If an in-line injection pump, in which for each injection nozzle 10 one separate pump element with a pump piston is provided, is used instead of a fuel injection pump 23 of the distributor type, then one first magnet valve 41 per pump element is required. In that case, the connecting line 58 between the two magnet valves 41, 42 must be interrupted at the points marked A and B and reconnected via a parallel circuit of a plurality of check valves 59 of the kind in dashed lines in FIG. 4. The number of check valves 59 is equal to the number of existing pump elements of the fuel injection pump and hence to the number of injection nozzles 10 to be supplied and thus to the number of existing first magnet valves 41. The check valves 59 are built in in such a way that their flow direction is always from the respective first magnet valve 41 to the second magnet valve 42, only one of the latter being present. That is, there are multiple magnet valves 41 but only one second magnet valve 42. The drive of the distributor shaft 49 is effected, in the case of the in-line injection pump, via the in-line injection pump camshaft that drives the pump pistons of the various pump elements.

Figure 6:
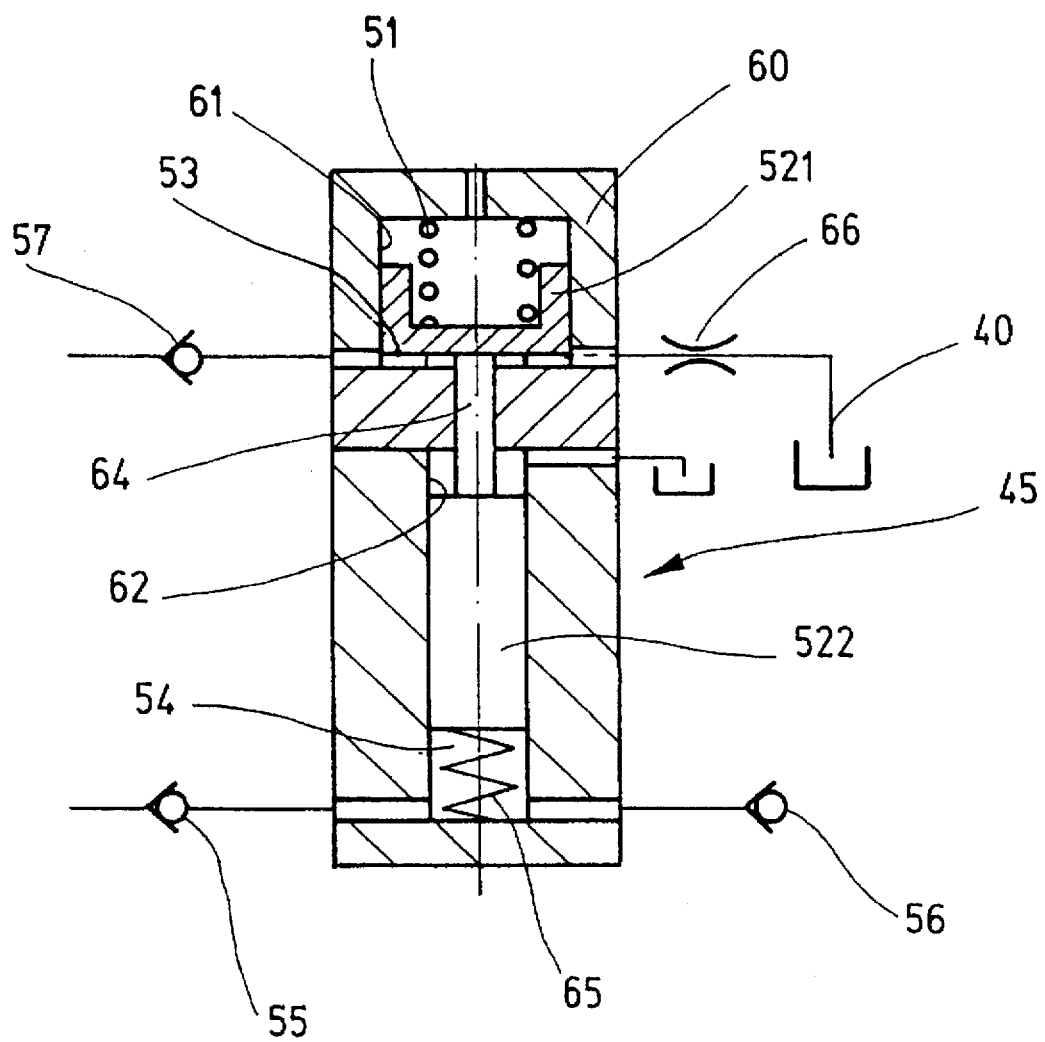
FIG. 6, a longitudinal section through a modified pressure step-up device in the metering device for the auxiliary fluid in the injection system of FIG. 4, shown schematically.

FIG. 6, in longitudinal section, schematically shows a modified pressure step-up device 45, which can likewise be used in the injection system of FIG. 4. Here, the two pistons 521 and 522 are not combined into a one-piece stepped piston but rather are axially displaceably guided separately in bores 61, 62 of a housing 60. In a third bore 63, which is coaxial with the two bores 61, 62, a tappet 64 is axially displaceably guided; the respective face ends of this tappet nonpositively engage the piston 521 and the piston 522, respectively. The nonpositive engagement is brought about by the piston spring 51 and by a contact-pressure spring 65 located on the positive displacement chamber 54. In the same way as in FIG. 4, the positive displacement chamber 54 should be connected to the prefeed pump 31 via the inlet valve 55 and to the distributor 46 via the outlet valve 56. The control chamber 53 is connected on the inlet side to the magnet valve assembly 27 via the check valve 57. On the outlet side, it communicates with the relief line 40 via the throttle 66. Such a throttle 66 for evacuating the control chamber 53 until the next pump piston stroke of the fuel injection pump 23 is also provided in the case of the pressure step-up device 45 of FIG. 4.

As a result of the embodiment of this pressure step-up device 45, the design of the stepped bore for receiving the pistons 521, 522 is not as critical as in the case of the one-piece stepped piston 52 of FIG. 4, since accurate alignment of the various bores 61–63 can be dispensed with. In the dimensioning, care must be taken that the contrary force exerted on the piston 522 on the water side is less than the sum of the spring force of the spring 65 and the force of the water pressure in the positive displacement chamber 54. The contrary force is the result of the cross-sectional area of the tappet 64 and the pressure in the control chamber 53.

The invention is not limited to the exemplary embodiments described above. For instance, instead of water, an alternative fuel such as alcohol fuel, by which the ignition conditions of the Diesel fuel are improved, can be used as the auxiliary fluid.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An injection system for combined injection of a combustible fuel, especially Diesel fuel, and an auxiliary fluid, especially water, into at least one combustion chamber of an internal combustion engine, especially a Diesel engine, comprising at least one injection nozzle (10), associated with the at least one combustion chamber, for fuel injection, said nozzle has a nozzle body (11) with an injection opening (12) and a nozzle chamber (13) preceding said injection opening that communicates with first and second separate nozzle connections (15, 16), and a nozzle needle (14) that closes the injection opening (12) and opens under injection pressure; a fuel injection pump with at least one pump piston for pumping fuel that is at an injection pressure to at least one supply outlet that communicates via an equal-pressure valve (17) with said first nozzle connection (15) of the injection nozzle (10); a metering device (25), that communicates via a downstream check valve (18) with said second nozzle connection (16) of the injection nozzle (10), for introducing a quantity of auxiliary fluid into the nozzle chamber (13) of the injection nozzle (10), said metering device has a prefeed pump (31) and a pressure generator (33) that by imposition of fuel from the fuel injection pump (23) generates a fluid pressure in a metering line (34) that is above a standing pressure maintained by the equal-pressure valve (17) in the nozzle chamber (13) of the injection nozzle (10) when fuel injection is not occurring; and having a magnet valve assembly (27), disposed between the fuel injection pump (23) and the pressure generator (33), for acting upon the pressure generator (33) with fuel, said magnet valve assembly is capable of opening a relief line (40), the connection of the magnet valve assembly, toward the fuel injection pump, is affected at the at least one supply outlet preceding the equal-pressure valve (17), and that the magnet valve assembly (27) is controlled such that during the supply stroke of the pump piston of the fuel injection pump (23), the magnet valve closes at the onset of fuel supply, and opens at the end of injection, and for a predetermined duration of the remaining supply stroke of the pump piston, connects the supply outlet of the fuel injection pump (23) to the pressure generator (33) of the metering device (25).

2. A system according to claim 1, in which the pressure generator (33) has a dividing piston (35), connected to a prefeed pump (31) for the auxiliary fluid, said dividing piston is displaceable by fuel actuation counter to a restoring spring (36) and in the process positively displaces a quantity of auxiliary fluid, a spring reservoir (37) communicates with the dividing piston (35) and comprises a reservoir cylinder, reservoir spring (38) and reservoir piston, a travel transducer (39) senses the displacement travel of the reservoir piston; a hydraulically controlled switch element (20) is disposed between the check valve (18) associated with the injection nozzle (10) and the metering line (24) connected to the check valve, said hydraulically controlled switch element (20) is connected by a control inlet to the supply outlet of the fuel injection pump (23) and is designed such that said hydraulically controlled switch element blocks the nozzle connection (16) above a pressure that is approximately equivalent to a standing pressure established by the equal-pressure valve (17).

3. A system according to claim 2, in which the injection nozzle (10), the equal-pressure valve (17) connected to the first nozzle connection (15), the check valve (18) connected to the second nozzle connection (16), and the switch element (20) are combined into a structural nozzle module (30) which has a first connection (21) that communicates with the equal-pressure valve (17), an injection line (22) leads to the supply outlet of the fuel injection pump (23), a second connection (24) connects with the metering line (34) and communicates with the switch element (20), and a third connection (26) connects with the magnet valve assembly (26), and communicates with the first connection (21) via a second integrated check valve (19); and that the control inlet of the switch element (20) communicates with the first connection (21).

4. A system according to claim 2, in which the magnet valve assembly (27) has first and second 2/2-way magnet valves (41, 42) with spring restoration, each of said first and second 2/2-way magnet valves are connected on an inlet side to the supply outlet of the fuel injection pump (23) and are connected to a third outlet (26) of the structural nozzle module (30), of which the first magnet valve (41) communicates on an outlet side with a relief line (40) and the second magnet valve (42) communicates on an outlet side with the dividing piston (35).

5. A system according to claim 3, in which the magnet valve assembly (27) has first and second 2/2-way magnet valves (41, 42) with spring restoration, each of said first and second 2/2-way magnet valves are connected on an inlet side to the supply outlet of the fuel injection pump (23) and are connected to a third outlet (26) of the structural nozzle module (30), of which the first magnet valve (41) communicates on an outlet side with a relief line (40) and the second magnet valve (42) communicates on an outlet side with the dividing piston (35).

6. A system according to claim 2, in which the magnet valve assembly (27) has first and second 2/2-way magnet valves (41, 42) with spring restoration; that the first magnet valve (41) communicates on an inlet side with the supply outlet of the fuel injection pump (23), and the third outlet (26) of the structural nozzle module (30), and on an outlet side with the relief line (40), and the second magnet valve (42) communicates on an inlet side with the dividing piston (35) and on an outlet side with the relief line (40); a check valve (43) is connected between the inlets of the first and second magnet valves (41, 42) whose flow direction is toward the second magnet valve (42) and whose flow cross section is greater than that of the second magnet valve (42).

7. A system according to claim 3, in which the magnet valve assembly (27) has first and second 2/2-way magnet valves (41, 42) with spring restoration; that the first magnet valve (41) communicates on an inlet side with the supply outlet of the fuel injection pump (23), and the third outlet (26) of the structural nozzle module (30), and on an outlet side with the relief line (40), and the second magnet valve (42) communicates on an inlet side with the dividing piston (35) and on an outlet side with the relief line (40); a check valve (43) is connected between the inlets of the first and second magnet valves (41, 42) whose flow direction is toward the second magnet valve (42) and whose flow cross section is greater than that of the second magnet valve (42).

8. A system according to claim 4, in which an electronic control unit, which for a duration of fuel injection closes said first and second magnet valves (41, 42), opens the second magnet valve (42) at an end of fuel injection in response to a first sensor signal of the travel transducer (39), said travel transducer (39) signals a displacement of the reservoir piston in the spring reservoir (37) by a predetermined displacement travel, closes the second magnet valve (42) again and opens the first magnet valve (41), and in response to a second sensor signal of the travel transducer (39) signals a return of the reservoir piston in the spring reservoir (37) to a basic position, and opens the second magnet valve (42) again.

9. A system according to claim 6, in which an electronic control unit, which for a duration of fuel injection closes said first and second magnet valves (41, 42), opens the second magnet valve (42) at an end of fuel injection in response to a first sensor signal of the travel transducer (39), said travel transducer (39) signals a displacement of the reservoir piston in the spring reservoir (37) by a predetermined displacement travel, closes the second magnet valve (42) again and opens the first magnet valve (41), and in response to a second sensor signal of the travel transducer (39) signals a return of the reservoir piston in the spring reservoir (37) to a basic position, and opens the second magnet valve (42) again.

10. A system according to claim 1, in which the pressure generator (33) has a pressure step-up device (45), with a stepped piston (52) that is displaceable counter to a restoring spring (51), said stepped piston includes a larger-diameter piston part (521) which defines a control chamber (53) connected to the magnet valve assembly (27) and with a smaller-diameter piston part (522) defines a positive displacement chamber (54) connected to the prefeed pump (31) for the auxiliary fluid; that the metering device (25) for the auxiliary fluid has a distributor (46) with a distributor cylinder (47) that has a plurality of radial outflow bores (48) distributed uniformly over the circumference, and having a distributor shaft (49) that rotates in said distributor cylinder and is driven by the fuel injection pump (23), said distributor shaft has a distributor bore (50), connected to the positive displacement chamber (54) of the pressure step-up device (45) and entering into communication successively with each of the outflow bores (48) upon rotation of the distributor shaft (49); and that the metering line (34) for the injection nozzle (10) is connected to an outflow bore (50) of the distributor (46).

11. A system according to claim 10, in which the positive displacement chamber (54) is provided with one inlet and one outlet valve (55, 56) which are both embodied as a one-way valve.

12. The system according to claim 10, in which the magnet valve assembly (27) has at least one first 2/2-way magnet valve (41) with spring restoration and one second 2/2-way magnet valve (42) with spring restoration; that the first and second magnet valves (41, 42) are connected in series, the first magnet valve (41) being connected on the inlet side to the supply outlet of the fuel injection pump (23) and the second magnet valve (42) being connected on the outlet side to the relief line (40).

13. The system according to claim 11, in which the magnet valve assembly (27) has at least one first 2/2-way magnet valve (41) with spring restoration and one second 2/2-way magnet valve (42) with spring restoration; that the first and second magnet valves (41, 42) are connected in series, the first magnet valve (41) being connected on the inlet side to the supply outlet of the fuel injection pump (23) and the second magnet valve (42) being connected on the outlet side to the relief line (40).

14. A system according to claim 13, in which the fuel injection pump (23) is a distributor injection pump that has a distributor piston that rotates upon a reciprocating motion of the pump; that the distributor shaft (49) of the distributor (46) of the metering device (25) is driven synchronously by the distributor piston or is integrated with the distributor piston itself.

15. A system according to claim 13, in which the fuel injection pump (23) is an in-line injection pump, which has one pump piston, driven for a reciprocating motion by a camshaft for each supply outlet; that the distributor shaft (49) of the distributor (46) of the metering device (25) is driven by a camshaft; that the magnet valve assembly (27) has a number of first magnet valves (41) with spring restoration that corresponds to a number of supply outlets; and that a communication of the first magnet valves (41) to the second magnet valve (42) is effected in each case via a check valve (59) in which flow direction is toward the second magnet valve (42).

16. A system according to claim 10, which includes an electronic control unit, which for a duration of the fuel injection, said electronic control unit closes the first magnet valve (41), opens the first magnet valve (41) at the end of the fuel injection, and after a predetermined period of time closes the second magnet valve (42), and after the pump or distributor piston of the fuel injection pump (23) has passed through top dead center, opens the second magnet valve (42) again.

17. A system according to claim 11, which includes an electronic control unit, which for a duration of the fuel injection, said electronic control unit closes the first magnet valve (41), opens the first magnet valve (41) at the end of the fuel injection, and after a predetermined period of time closes the second magnet valve (42), and after the pump or distributor piston of the fuel injection pump (23) has passed through top dead center, opens the second magnet valve (42) again.

18. A system according to claim 11, which includes an electronic control unit, which for a duration of the fuel injection, said electronic control unit closes the first magnet valve (41), opens the first magnet valve (41) at the end of the fuel injection, and after a predetermined period of time closes the second magnet valve (42), and after the pump or distributor piston of the fuel injection pump (23) has passed through top dead center, opens the second magnet valve (42) again.

19. A system according to claim 10, in which the stepped piston (52) is embodied in first and second piston parts; that the restoring spring (51) engages a first larger-diameter piston part (521) and a contact-pressure spring (65) engages a second smaller-diameter piston part (522); and that the first and second piston parts (521, 522) are supported by their face ends facing toward one another, under an influence of a restoring spring (51) and a contact-pressure spring (65), on a displaceably guided tappet (64) disposed between said first and second piston parts.

20. A system according to claim 11, in which the stepped piston (52) is embodied in first and second piston parts; that the restoring spring (51) engages a first larger-diameter piston part (521) and a contact-pressure spring (65) engages a second smaller-diameter piston part (522); and that the first and second piston parts (521, 522) are supported by their face ends facing toward one another, under an influence of a restoring spring (51) and a contact-pressure spring (65), on a displaceably guided tappet (64) disposed between said first and second piston parts.

21. A system according to claim 12, in which the stepped piston (52) is embodied in first and second piston parts; that the restoring spring (51) engages a first larger-diameter piston part (521) and a contact-pressure spring (65) engages a second smaller-diameter piston part (522); and that the first and second piston parts (521, 522) are supported by their face ends facing toward one another, under an influence of a restoring spring (51) and a contact-pressure spring (65), on a displaceably guided tappet (64) disposed between said first and second piston parts.

* * * * *